United States Patent [19]
Larue et al.

[11] 4,237,964
[45] Dec. 9, 1980

[54] HEAT EXCHANGE PROCESS WITH HEAT ACCUMULATION

[75] Inventors: Joseph Larue, Vaucresson; Alexandre Rojey, Garches, both of France

[73] Assignee: Institut Francais du Petrole, Rueil-Malmaison, France

[21] Appl. No.: 45,794

[22] Filed: Jun. 5, 1979

[30] Foreign Application Priority Data
Jun. 5, 1978 [FR] France ................................ 78 16791

[51] Int. Cl.³ ............................................ F28D 21/00
[52] U.S. Cl. ...................................... 165/1; 126/435; 126/436; 126/437; 165/104 S; 252/70
[58] Field of Search ................. 165/104 S, 1; 126/435, 126/436, 437, 400; 252/70

[56] References Cited
U.S. PATENT DOCUMENTS

| 1,297,633 | 3/1919 | Ashley | 165/104 S X |
| 4,109,702 | 8/1978 | Greene | 126/400 X |
| 4,124,061 | 11/1978 | Mitchell et al. | 165/104 S X |

Primary Examiner—Albert W. Davis
Attorney, Agent, or Firm—Millen & White

[57] ABSTRACT

System for storing thermal energy obtained from a heat source operable in a discontinuous manner, such as a solar collector, comprising the successive steps of using this thermal energy to raise the temperature of a solid substance, dispersed in a liquid, above its melting point so as to obtain an emulsion of said substance in said liquid and of using a cold source in thermal exchange with said emulsion to decrease the temperature of said emulsion so as to obtain a dispersion of solid substance in the liquid and further comprising means for storing the obtained emulsion or dispersion under adiabatic conditions before proceeding to the following step.

15 Claims, 2 Drawing Figures

FIG_2
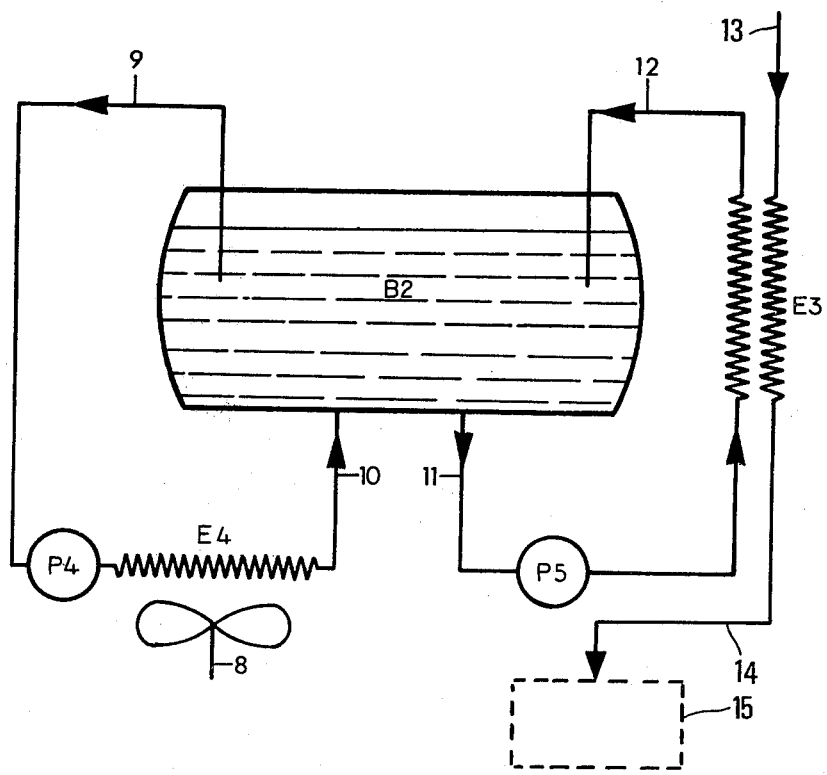

HEAT EXCHANGE PROCESS WITH HEAT ACCUMULATION

BACKGROUND OF THE INVENTION

This invention concerns a process for recovering heat from a heat source A, to provide it to a heat source B, and comprising a heat accumulation step.

The use of fossil fuels such as coal, crude oil or natural gas does not raise problems of heat storage since such fuels can be used without difficulty at the very moment of energy demand. On the contrary, some of the new heat sources require storage capacity for utilization for example in the case of the solar energy which is collected in a discontinuous and time and weather contingent manner.

Thermal energy may be stored by means of a liquid and/or solid material, as sensible heat and/or latent heat of physical phase changes. The use of the sensible heat of a substance to store thermal energy suffers from two major disadvantages: on the one hand, the temperature of the material varies as soon as a heat transfer occurs, resulting in poor efficiency of the system; on the other hand, the amount of heat stored per volume unit is low. Conversely, thermal storage by means of a material involving the use of the latent heat of transformation offers the two following advantages: In the case of a pure substance, the heat transfer is effected at constant temperature during the change in state and more energy is involved. Nevertheless, at a temperature lower than the melting point of the material, the heat transfer in a solid medium cannot be achieved except by conduction, and this is a limitation to the process flexibility.

SUMMARY

This invention provides for the storage of the thermal energy by change in state (solid to liquid or vice-versa) in a fluid having the rheological properties of a liquid over the whole considered temperature range and which will be designated by the term of permanent fluid. The latter is an emulsion consisting of:

(a) A continuous phase which is always in the liquid state within the considered temperature range, (b) a phase dispersed in the continuous phase, said dispersed phase being in the form of microparticles (microcrystals, microdroplets) capable of changing its physical state (solid to liquid and vice-versa) within the considered temperature range.

The two component phases of the emulsion must not be completely miscible with each other. Their mutual solubility is usefully lower than 5% by weight and, preferably, as low as possible. Irrespective of this mutual partial solubility, the proportion of the dispersed phase at equilibrium must be at least 5% by weight, for example from 10 to 70%. The higher the dispersed phase content, the greater the thermal capacity; however, the latter is limited by the stability and the pumpability of the emulsion.

The particles of dispersed phase are preferably very small (preferred diameter lower than $10\mu$, for example from 0.1 to $10\mu$); in this case, and irrespective of the physical state (solid or liquid) of the dispersed phase, the emulsion appears as a liquid which become more viscous as the proportion of the dispersed phase is increased, but which still can be circulated through a pump.

The use of such an emulsion as a thermal storage fluid is of technical interest only when the temperature range wherein the fluid temperature varies during the thermal exchanges includes the temperature of the change in state of the dispersed phase; since otherwise, only the sensible heat is involved and the process loses its interest.

The selection of the emulsion constituents is guided by the temperature level at which the energy must be stored. The constituent of the dispersed phase is at first so selected that its melting point be in the storage temperature range; the continuous phase is then determined by taking also into account the storage temperature and the miscibility of the dispersed phase.

For stabilizing the emulsion, it is preferable to add one or more surface-active agents to the emulsion. The selection of the most suitable surface-active agent in each case only requires a few preliminary experiments which are within the field of knowledge of those skilled in the art. It is not necessary to make further reference thereto. It suffices to recall that these agents may be anionic such as sodium dodecyl sulfate, sodium dodecyl benzene sulfonate, cationic such as dodecyl trimethyl ammonium chloride, cetyltriethylammonium iodide, non-ionic such as polyglycol ethers or fatty alcohols and/or polymeric such as polyvinyl alcohol.

The preparation of the emulsion may be performed in a conventional emulsifier such as a rotor-mixer, a turbo-disperser, a tank provided with a sound generator and a static mixer; however, the apparatus must be so equipped as to maintain the temperature of the emulsion above the melting point of the dispersed phase so that both phases be liquid.

In spite of the presence of suitable surface-active agents, the quality of the emulsion may be affected by the successive state changes of the dispersed phase, or a beginning coalescence may appear: this disadvantage may be avoided when the emulsion circulates for the needs of thermal transfers, through a centrifugal pump which has the effect of maintaining the dispersion state of the phases.

The process of the invention may be the object of two embodiments according to the type of storage either by melting or by crystallization of the dispersed material.

The emulsion may be used for storing heat collected from solar collectors; in particular, it is possible to use it as unique fluid circulating through the solar collectors, the storage vessel and the heating system.

BRIEF DESCRIPTION OF THE DRAWINGS

The accompanying drawings are not to be considered as limited to the details given in the examples, but illustrate, in a very general manner, the invention, whereas:

FIG. 2 is a schematic flowsheet of an embodiment wherein refrigerant values are stored by a crystallized dispersed phase.

DETAILED DESCRIPTION OF THE DRAWINGS

1—Storage by Melting

Figure 1:
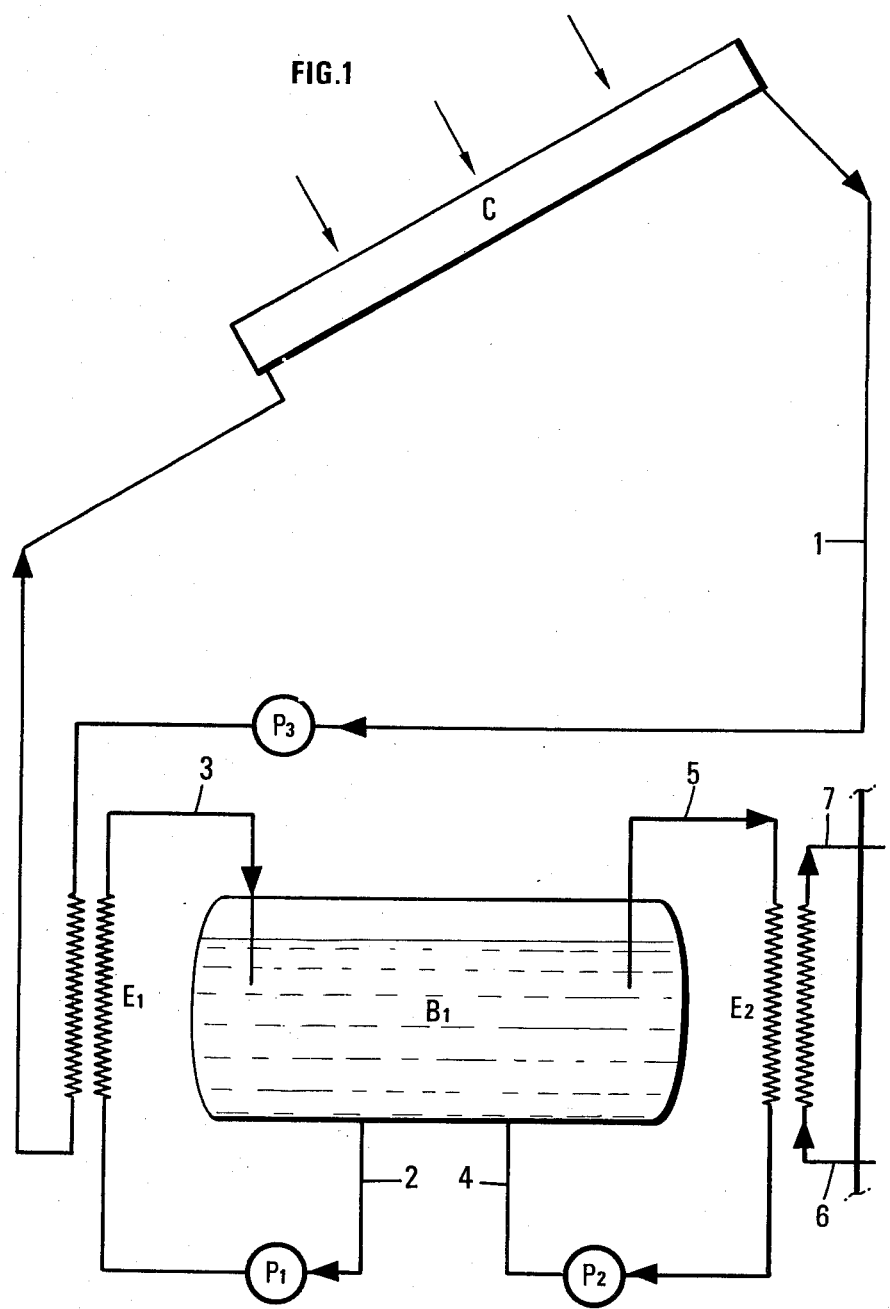
FIG. 1 is a schematic flowsheet of an embodiment of a solar heat system wherein heat is stored by a molten dispersed phase.

In this case, the emulsion stores thermal energy by passing from a temperature $T_1$, lower than the melting point $T_f$ of the dispersed phase, to a temperature $T_2$ higher than $T_f$. When using the heat, the emulsion temperature passes from $T_2$ to $T'_1$ (lower than $T_f$).

EXAMPLE 1

Example 1 is illustrated by FIG. 1. The thermally-insulated vessel $B_1$ contains an emulsion whose continuous phase consists of 10 metric tons of water containing 1% by weight of a surface-active agent consisting of sodium lauryl sulfate; the dispersed phase of the emulsion is formed of 10 metric tons of stearic acid whose melting point is 69° C. The volume of the emulsion is 21.76 m³ at 80° C. and 20.62 m³ at 60° C. in view of the difference of the volumic mass of stearic acid.

During the "storing" phase, which lasts about four months, the device provides for the storage of heat provided by a solar collector C. Based on an average operation time of 8 hours per day during the storage phase, the average thermal power produced by the collector is 900 W. The collected heat is transmitted to a water stream of 80 l/h which issues from collector C through duct 1 and is circulated through pump $P_3$. This water stream exchanges heat in exchanger $E_1$ at an emulsion flow rate of 100 l/h. The corresponding amount is withdrawn from tank $B_1$ through duct 2, supplied to exchanger $E_1$ through pump $P_1$ and fed back to tank $B_1$ through duct 3.

During the storage phase, the inner temperature of the tank varies between 60° and 80° C. During this phase, $772 \times 10^3$ Kcal have thus been stored.

During the "destoring" or utilization phase, pump $P_2$ is actuated: 100 liters/h of emulsion is collected through duct 5 and fed back to tank $B_1$ through duct 4 after having released heat in exchanger $E_2$ to 40 liters/hour water to be used for heating an enclosure, said water being fed to exchanger $E_2$ through duct 6 and discharged through duct 7.

During the "destoring" phase, the temperature in tank $B_1$ varies, which means that when the temperature rises, the emulsion operates to store thermal values. However, during the total period, the temperature varies from 80° to 60° C., which means that the heat stored during the "storing" period, i.e. $772 \times 10^3$ Kcal, is delivered to the heated enclosure during the "destoring" phase.

In order to proceed to the same operation, within the same temperature range while replacing the emulsion with water, the required storage volume would be 38.6 m³.

2—Storage by Crystallization

In this case, the emulsion stores cold (refrigerant values) by passing from a temperature $T_1$ higher than the melting point $T_f$ of the dispersed phase, to a temperature $T_2$ lower than $T_f$. When destoring, the temperature passes from $T_2$ to $T'_1$ (higher than $T_f$).

EXAMPLE 2

This thermally insulated vessel example is illustrated by FIG. 2. The $B_2$, contains an emulsion whose continuous phase consists of 10 metric/tons of a thermal fluid of the alkylbenzene hydrocarbon type such as Gilotherm D 12, sold by Rhone-Poulenc, which is in the liquid state within the considered temperature range and which contains 1% by weight of a surface-active agent, polyethylene glycol sorbitol monooelate; the dispersed phase of the emulsion is formed of 10 metric/tons of water whose melting point is 0° C. The volume of the emulsion is 23.7 m3 below 0° C., and 22.9 m3 above 0° C., as a result of the difference of volumic mass between ice and water.

During the cold "storage" period, which is preferably in winter, the emulsion is withdrawn from flask $B_2$ through line 9 by means of pump $P_4$ and circulates through exchanger $E_4$ where it is cooled down by external cold air ventilation performed by means of helix 8; the emulsion is fed back to flask $B_2$ through duct 10. Pump $P_5$ does not work. The temperature of the storage flask, which was initially 15° C. decreases to $-5°$ C. at the end of the storage period; the heat amount so transferred by the emulsion amounts to $1066 \times 10^3$ Kcal.

During the cold "destorage" period, which is preferably selected during summer, the emulsion is withdrawn from flask $B_2$ through line 11 by means of pump $P_5$ and circulates within exchanger $E_3$ where it is heated by absorbing heat from an air stream fed from the outside through line 13 and which enters the enclosure 15 to be thermally regulated, through line 14. The emulsion is fed back to the flask $B_2$ through line 12. The temperature of the storage flask progressively rises up from $-5°$ to 15° C.

For achieving the same operation, over the same time interval, while replacing the emulsion with a 17% by weight calcium chloride aqueous solution, the required stored volume would be 59.9 m³.

The use of this process is not limited to the products mentioned in these two examples. The dispersed phase of the emulsion may consist for example of naphthalene, palmitic acid, alpha-naphthol, 2,4,6-tri-bromo phenol, paradichlorobenzene, parachloronitrobenzene, orthonitroaniline, diphenyl, phenanthrene, benzil, a heavy paraffin, an inorganic salt or a mixture of some of these products in the case of storage by melting or may consist of water, an inorganic salt, a saturated hydrocarbon, a halogenated hydrocarbon or a mixture of some of these products in the case of storage by crystallization. The continuous phase of the emulsion may consist, for example, of water, ethylene glycol, diethylene glycol, glycerol, polyethylene glycol, a saturated alcohol, a saturated or unsaturated hydrocarbon, a halogenated hydrocarbon, an aromatic hydrocarbon or a mixture of some of these products for the storage by melting or by crystallization.

In the appended claims, it is meant by storage in adiabatic conditions, the fact that the emulsion and/or dispersion is maintained for a certain time, for example 10 minutes to 8 days or more, in one or more thermally insulated vessels, so as to avoid to the largest possible extent, heat exchange with the outside.

What we claim is:

1. A heat exchange process comprising a thermal storage step, which comprises repeatedly conducting the following successive steps:
    (a) the temperature of a dispersed substance (A) in solid state in a liquid (B) is raised by thermal exchange with a heat source to above the melting temperature of said substance (A) so as to obtain an emulsion of melted substance (A) in liquid (B), and then
    (b) the temperature of the emulsion of the melted substance (A) in liquid (B) is allowed to decrease, by thermal exchange with a cold source, to below the temperature of solidification of the melted substance (A) so as to obtain a dispersion of the solid substance (A) in liquid (B), said process being remarkable in that, after at least one step (a) or one step (b), the obtained emulsion or dispersion is stored under adiabatic conditions before proceeding to the following step, the process beginning with a step (a) or a step (b).

2. A process according to claim 1 wherein the storage is performed at least after step (a).

3. A process according to claim 1, wherein the storage is performed at least after step (b).

4. A process according to claim 1, wherein the process begins with step (a).

5. A process according to claim 1, wherein the process begins with step (b).

6. A process according to claim 1 wherein substance (A) and liquid (B) have a mutual solubility lower than 5% by weight, the proportion of substance (A) dispersed and/or emulsified being at least 5% of the total weight of the dispersion and/or emulsion.

7. A process according to claim 6, wherein said proportion is from 10 to 70%.

8. A process according to claim 1 wherein the dispersion and/or emulsion contains at least one surface-active agent.

9. A process according to claim 2, wherein substance (A) is naphthalene, an organic acid, alpha-naphthol, 2,4,6-tri-bromophenol, paradichlorobenzene, parachloronitrobenzene, orthonitroaniline, diphenyl, phenanthrene, benzil, a heavy paraffin, an inorganic salt or a mixture of some of these products and liquid (B) is water, ethylene glycol, diethylene glycol, glycerol, polyethylene glycol, a saturated alcohol, a saturated or unsaturated hydrocarbon, a halogenated hydrocarbon, an aromatic hydrocarbon or a mixture of some of these products.

10. A process according to claim 3, wherein substance (A) is water, an inorganic salt, a saturated or unsaturated hydrocarbon, a halogenated hydrocarbon or a mixture of some of these products and liquid (B) is water, ethylene glycol, diethylene glycol, glycerol, polyethylene glycol, a saturated alcohol, a saturated or unsaturated hydrocarbon, a halogenated hydrocarbon, an aromatic hydrocarbon or a mixture of some of these products.

11. A process according to claim 2 wherein the heat source is a solar collector.

12. A process according to claim 3, wherein the cold source is external air or water.

13. A process according to claim 1, wherein the diameter of the particles of dispersed phase is from 0.1 to 10$\mu$.

14. A process according to claim 2, wherein the emulsion and/or dispersion is formed of a linear paraffin, water and polyglycol ether of fatty alcohol.

15. A process according to claim 11 wherein the emulsion directly circulates in the solar collector.

* * * * *